(12) United States Patent
Dekker et al.

(10) Patent No.: US 7,940,623 B1
(45) Date of Patent: May 10, 2011

(54) METHODS AND DEVICES FOR RECORDING MARKS IN AN INFORMATION LAYER OF AN OPTICAL RECORD CARRIER, AND RECORD CARRIERS FOR USE THEREIN

(75) Inventors: Martijn Jeroen Dekker, Eindhoven (NL); Hendrikus Bernardus Van Den Brink, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 2627 days.

(21) Appl. No.: 09/787,094

(22) PCT Filed: Jul. 11, 2000

(86) PCT No.: PCT/EP00/06589
§ 371 (c)(1),
(2), (4) Date: Mar. 13, 2001

(87) PCT Pub. No.: WO01/06500
PCT Pub. Date: Jan. 25, 2001

(30) Foreign Application Priority Data

Jul. 15, 1999 (EP) ..................................... 99202333

(51) Int. Cl.
*G11B 7/125* (2006.01)
(52) U.S. Cl. .................................... 369/59.11; 369/47.5
(58) Field of Classification Search ................. 369/47.5, 369/47.51, 59.11, 47.52
See application file for complete search history.

(56) References Cited

U.S. PATENT DOCUMENTS

| | | | | |
|---|---|---|---|---|
| 5,412,626 | A | | 5/1995 | Ohno et al. |
| 5,590,111 | A | * | 12/1996 | Kirino et al. ............... 369/47.53 |
| 5,818,808 | A | * | 10/1998 | Takada et al. ................. 369/116 |
| 5,825,742 | A | * | 10/1998 | Tanaka et al. ............. 369/59.11 |
| 6,104,685 | A | * | 8/2000 | Saga et al. ................. 369/59.11 |
| 6,153,063 | A | * | 11/2000 | Yamada et al. .......... 204/192.22 |
| 6,236,635 | B1 | * | 5/2001 | Miyamoto et al. ............ 369/116 |
| 6,272,100 | B1 | * | 8/2001 | Toda et al. .................... 369/116 |
| 6,345,026 | B1 | * | 2/2002 | Furukawa et al. ......... 369/59.11 |
| 6,584,051 | B1 | * | 6/2003 | Zhou et al. ................. 369/47.51 |

FOREIGN PATENT DOCUMENTS

JP 08287465 A 11/1996

* cited by examiner

*Primary Examiner* — Hoa T. Nguyen
*Assistant Examiner* — Michael V. Battaglia
(74) *Attorney, Agent, or Firm* — Michael E. Belk

(57) ABSTRACT

Methods and devices are described for writing to an optical record carrier, in which a mark representing recorded data is written in a phase-change layer of a record carrier by a sequence of radiation pulses. A rear heating pulse is introduced after a last write pulse and a front heating pulse is introduced before the first write pulse. The power level of the front heating pulse and the power level of the rear heating pulse may be dependent on the length of the mark to be recorded and on properties of the record carrier. The method results in a reduced jitter of the marks written, especially when writing at high recording speeds.

25 Claims, 3 Drawing Sheets

Figure 5:
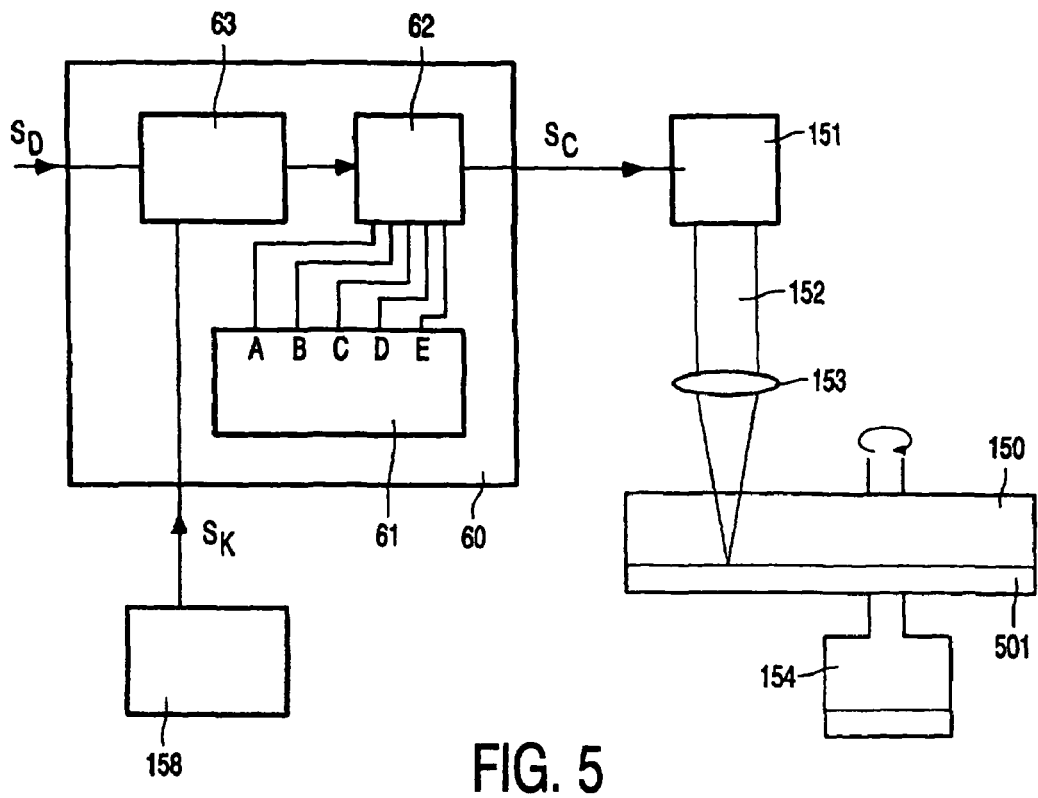

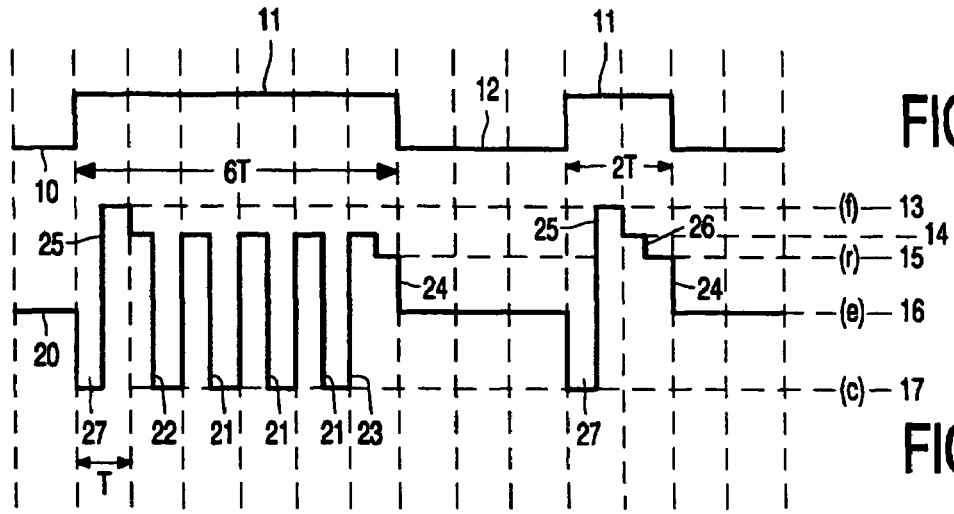
FIG. 1a
FIG. 1b
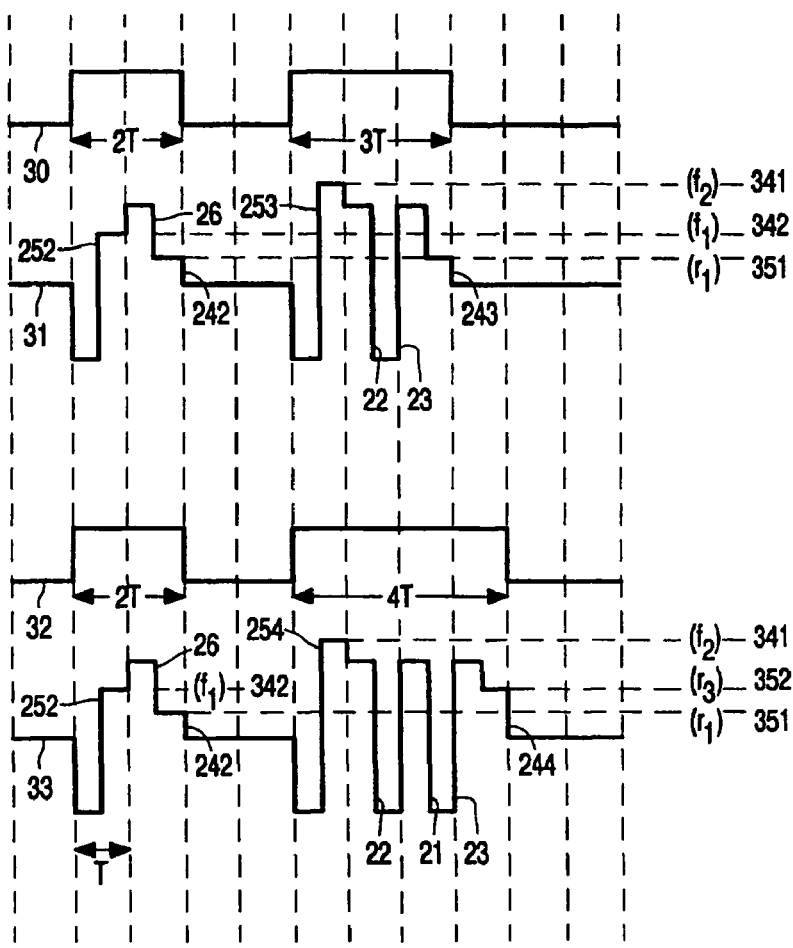
FIG. 2a
FIG. 2b
FIG. 2c
FIG. 2d

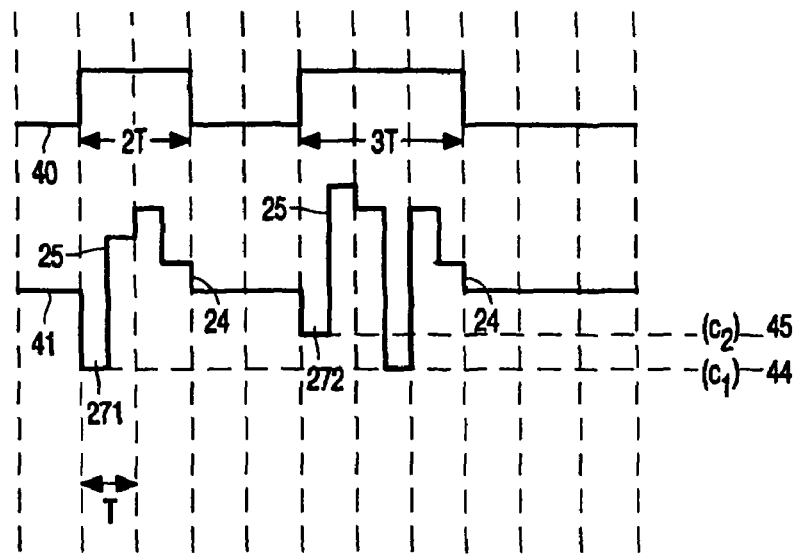
FIG. 3a
FIG. 3b
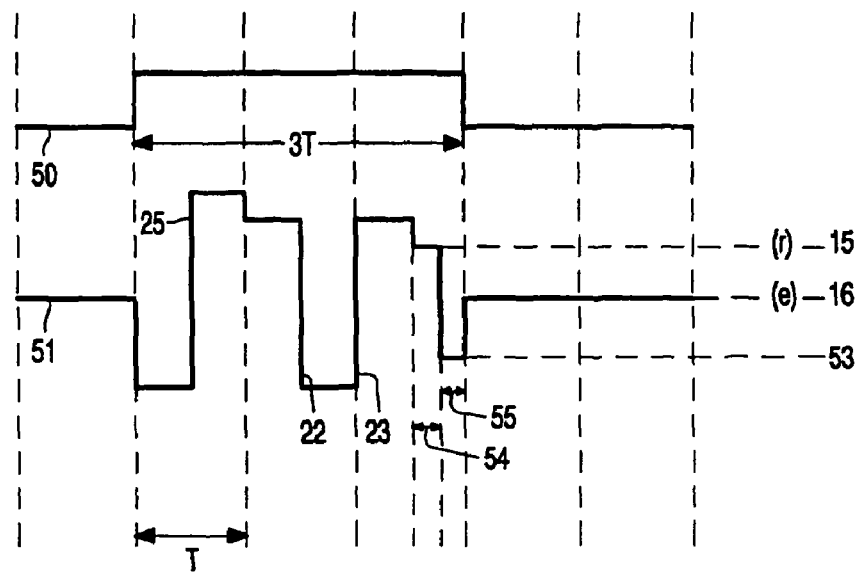
FIG. 4a
FIG. 4b

METHODS AND DEVICES FOR RECORDING MARKS IN AN INFORMATION LAYER OF AN OPTICAL RECORD CARRIER, AND RECORD CARRIERS FOR USE THEREIN

The invention relates to a method of recording marks representing data in a recording medium, said recording medium comprising an information layer having a phase which is reversibly changeable between a crystal phase and an amorphous phase, by irradiating the information layer with a pulsed radiation beam, each mark being written by a sequence of pulses comprising at least one write pulse, the written marks being erasable by irradiating the information layer with a radiation beam having an erase power level (e), a first write pulse of a sequence of pulses being preceded by a cooling pulse having a cooling power level (c) which is lower than the erase power level (e), said radiation beam being generated by a radiation source.

The invention also relates to a recording device for recording data in the form of marks on a recording medium, said recording medium comprising an information layer having a phase which is reversibly changeable between a crystal phase and an amorphous phase, by irradiating the information layer with a pulsed radiation beam, the recorded marks being erasable by irradiating the information layer with a radiation beam having an erase power level (e), the device comprising a radiation source providing the radiation beam and a control unit for controlling the power of the radiation beam, the control unit being operative for providing a sequence of write pulses for writing a mark and controlling the power of the radiation beam such that it has a cooling power level (c) which is lower than the erase power level (e) preceding a first write pulse of a sequence of pulses.

The invention further relates to a recording medium for use in a recording device, said recording medium comprising an information layer having a phase which is reversibly changeable between a crystal phase and an amorphous phase, and comprising an area containing recording parameters.

A recording method and device as described in the preamble are known from U.S. Pat. No. 5,412,626. A mark is written by a sequence of write pulses and the previously written marks between the marks being written are erased by applying an erase power level (e) in between the sequences. The known sequence has a cooling power level (c) immediately before a first write pulse of the sequence, the cooling power level (c) being lower than the erase power level (e). The cooling power level (c) may be any power level lower than the erase power level (e), including a radiation source off level. The power level in between the write pulses may be any power level in the range between the erase power level (e) and the cooling power level (c). As the cooling power level (c) is immediately before the first write pulse of the sequence, a stable recorded mark can be formed, resulting in a mark having a low jitter. The jitter is the standard deviation of the time differences between level transitions in a digitized read signal and the corresponding transitions in a clock signal, the time difference being normalized by the duration of one period of said clock.

The known method is suitable for direct-overwrite on a record carrier, i.e., by writing information to be recorded in the information layer of the record carrier and at the same time erasing information previously written in the information layer.

A method of reducing the jitter in phase-change types of record carriers is disclosed in the JPA 08287465. In this method, the edges of write pulses in sequences of pulses are shifted in time. The extent of these time shifts is dependent on properties of the record carrier and of the recording device. In general, the time shifts are very small as compared with the duration of a write pulse.

It is a drawback of the method known from U.S. Pat. No. 5,412,626 that it does not head to sufficiently low jitter in the read signal obtained from reading marks written by using the method, especially when the marks are written at high recording speeds. It is a drawback of the method of reducing the jitter known from JPA 08287465 that it requires complex and expensive electronics to produce the time shifts with sufficient accuracy.

It is an object of the invention to provide a method of recording marks of the kind described in the opening paragraph, having a reduced jitter without the need for complex and expensive electronics.

This object is achieved when the method described in the preamble is characterized in that a last write pulse of a sequence is directly followed by a rear heating pulse having a rear heating power level (r), the rear heating power level (r) being higher than the erase power level (e).

Instead of returning to a cooling power level (c) or an erase power level (e) after a last write pulse in a sequence of pulses, a rear heating pulse having a rear heating power level (r) which is higher than the erase power level (e) is introduced, resulting in the jitter of the marks being smaller than the jitter of the marks recorded by means of the known method.

Modifying a power level in a sequence of write pulses requires less complex and less expensive electronics than are required for introducing very small shifts in time of the edges of the write pulses. Moreover, electronics for providing different power levels (such as, for example, the erase power level and the cooling power level) are already available in recording devices, and generally only a minor modification would be required for implementing the method according to the invention.

It may be apparent to a person skilled in the art that embodiments of the method according to the invention, introducing a rear heating pulse having more than one rear heating power level, such as, for example, step-wise descending power levels descending from the write power level to the erase power level, also result in a reduced jitter of the marks.

The method according to the invention especially has advantages when used in combination with a record carrier where a layer comprising an Al-alloy is replaced by a layer comprising Si and a dielectric layer, such as, for example, a layer comprising $ZnS:SiO_2$. These kinds of record carriers are known as Absorption Controlled record carriers. A typical high data rate phase-change record carrier comprises a layer of an Al-alloy deposited on a substrate. Provided on top of the layer comprising an Al-alloy are, successively, at least one dielectric layer, an information layer having a phase which is reversibly changeable between a crystal phase and an amorphous phase (i.e., a phase-change layer), and again at least one dielectric layer. In Absorption Controlled record carriers, the layer comprising an Al-alloy is replaced by, successively, a layer comprising $ZnS:SiO_2$ and a layer comprising Si on top of the substrate. A combination of the method according to the invention and a recording medium of the kind of Absorption Controlled record carriers described above results in a significant reduction of the jitter of the marks, especially when the marks are written at high recording speeds.

An embodiment of the method according to the invention is characterized in that the rear heating power level (r) of the rear heating pulse is dependent on properties of the recording medium.

The rear heating power level (r) can be assigned a fixed chosen value. Alternatively, the rear heating power level (r)

can be assigned a value which depends on properties of the individual record carrier on which marks are to be recorded. The value of the rear heating power level (r) to be used for an individual record carrier can be determined, for example, by a test procedure where sequences of pulses, with each sequence having a different value for the rear heating power level (r), are used to record marks, and the resulting marks are read back and analyzed. Other test procedures can be used alternatively. Finally, the optimal value for the rear heating power level (r) corresponding to an individual record carrier may be recorded on that record carrier. In this case, the value can be directly read from the record carrier by a recording device.

A preferred embodiment of the method according to the invention for recording marks having lengths of nT, where T represents the length of one period of a reference clock in a data signal and n represents a predetermined natural number larger than 1, is characterized in that the rear heating pulse has a first rear heating power level ($r_1$) when n=2, a second rear heating power level ($r_2$) when n=3, and a third rear heating power level ($r_3$) when n≧4, the first rear heating power level ($r_1$), the second rear heating power level ($r_2$), and the third rear heating power level ($r_3$) being dependent on properties of the recording medium.

A further reduction of the jitter is obtained when, instead of using a single rear heating power level (r) for all marks to be recorded, the rear heating power level is made dependent on the length of the marks to be recorded. This results in a significant reduction of the jitter, especially of the shorter marks, i.e., the marks having a length of 2T and 3T.

The rear heating power levels ($r_1$, $r_2$ and $r_3$) can each be assigned a fixed chosen value. Alternatively, the rear heating power levels ($r_1$, $r_2$ and $r_3$) can be assigned values which depend on properties of the individual record carrier on which marks are to be recorded. The values of the rear heating power levels ($r_1$, $r_2$ and $r_3$) to be used for an individual record carrier can be determined, for example, by a test procedure where sequences of pulses, with each sequence having different sets of values for the rear heating power levels ($r_1$, $r_2$ and $r_3$), are used to record marks, and the resulting marks are read back and analyzed. Other test procedures can be used alternatively. Finally, the optimal values for the rear heating power levels ($r_1$, $r_2$ and $r_3$) corresponding to an individual record carrier may be recorded on that record carrier. In this case, the values can be directly read from the record carrier by a recording device.

An embodiment of the method according to the invention is characterized in that the first write pulse of a sequence is directly preceded by a front heating pulse having a front heating power level (f), the front heating pulse being directly preceded by the cooling pulse having a cooling power level (c), the front heating power level (f) being higher than the erase power level (e).

A further reduction of the jitter is obtained when a front heating pulse is introduced between the cooling pulse and the first write pulse of a sequence of pulses, the front heating pulse having a front heating power level (f) which is higher than the erase power level (e). By introducing this front heating pulse, a symmetry is obtained between the front portion of a sequence of pulses and the rear portion of a sequence of pulses. The front heating power level (f) may have a value which is equal to the rear heating power level (r), or may have a value which is different from the rear heating power level (r).

An embodiment of the method according to the invention is characterized in that the front heating power level (f) of the front heating pulse is dependent on properties of the recording medium.

The front heating power level (f) can be assigned a fixed chosen value. Alternatively, the front heating power level (f) can be assigned a value which depends on properties of the individual record carrier on which marks are to be recorded. The value of the front heating power level (f) to be used for an individual record carrier can be determined by a test procedure or directly read from the record carrier, as described above in the case of the embodiment which is characterized in that the rear heating power level of the rear heating pulse is dependent on properties of the record carrier.

A preferred embodiment of the method according to the invention for recording marks having lengths of nT, where T represents the length of one period of a reference clock in a data signal and n represents a predetermined natural number larger than 1, is characterized in that the front heating pulse has a first front heating power level ($f_1$) when n=2, a second front heating power level ($f_2$) when n=3, and a third front heating power level ($f_3$) when n≧4, the first front heating power level ($f_1$), the second front heating power level ($f_2$), and the third front heating power level ($f_3$) being dependent on properties of the recording medium.

Instead of using a single front heating power level (f) for all marks to be recorded, the front heating power level is made dependent on the length of the marks to be recorded. This results in a significant reduction of the jitter, especially of the shorter marks, i.e., the marks having a length of 2T and 3T.

The front heating power levels ($f_1$, $f_2$ and $f_3$) can each be assigned a fixed chosen value. Alternatively, the front heating power levels ($f_1$, $f_2$ and $f_3$) can be assigned values which depend on properties of the individual record carrier on which marks are to be recorded. The values of the front heating power levels ($f_1$, $f_2$ and $f_3$) to be used for an individual record carrier can be determined by a test procedure or directly read from the record carrier, as described above in the case of the embodiment which is characterized in that the rear heating pulse has a first rear heating power level ($r_1$) when n=2, a second rear heating power level ($r_2$) when n=3, and a third rear heating power level ($r_3$) when n≧4.

An embodiment of the method according to the invention is characterized in that the cooling power level (c) of the cooling pulse is dependent on properties of the radiation source and the recording medium.

The cooling power level (c) can be assigned a fixed chosen value. Alternatively, the cooling power level (c) can be assigned a value which depends on properties of the individual record carrier on which marks are to be recorded and on properties of the radiation source. The value of the cooling power level (c) to be used for an individual record carrier can be determined by a test procedure as described above in the case of the embodiment which is characterized in that the rear heating power level of the rear heating pulse is dependent on properties of the record carrier.

By assigning the cooling power level (c) an optimal value which depends on properties of the individual record carrier on which marks are to be recorded and on properties of the radiation source, a fast transition from the cooling power level (c) to either the front heating pulse power level (f) or the power level of the first write pulse in a sequence is obtained. This results in well-defined marks, having a reduced jitter.

An embodiment of the method according to the invention for recording marks having lengths of nT, where T represents the length of one period of a reference clock in a data signal and n represents a predetermined natural number larger than 1, is characterized in that the cooling pulse has a first cooling power level ($c_1$) when n=2, a second cooling power level ($c_2$) when n=3, and a third cooling power level ($c_3$) when n≧4, the first cooling power level ($c_1$), the second cooling power level ($c_2$), and the third cooling power level ($c_3$) being dependent on properties of the radiation source and the recording medium.

Instead of using a single cooling power level (c) for all marks to be recorded, the cooling power level is made dependent on the length of the marks to be recorded. This results in a significant reduction of the jitter, especially of the shorter marks, i.e., the marks having a length of 2T and 3T.

The cooling power levels ($c_1$, $c_2$ and $c_3$) can each be assigned a fixed chosen value. Alternatively, the cooling power levels ($c_1$, $c_2$ and $c_3$) can be assigned values which depend on properties of the individual record carrier on which marks are to be recorded and on properties of the radiation source. The values of the cooling power levels ($c_1$, $c_2$ and $c_3$) to be used for an individual record carrier can be determined by a test procedure as described above in the case of the embodiment which is characterized in that the rear heating pulse has a first rear heating power level ($r_1$) when n=2, a second rear heating power level ($r_2$) when n=3, and a third rear heating power level ($r_3$) when n≧4.

An embodiment of the method according to the invention is characterized in that the rear heating pulse includes a front portion having the rear heating power level (r), and a rear portion having a power level which is lower than the erase power level (e).

It is a further object of the invention to provide a recording device of the kind described in the preamble, adapted for use of the method according to the invention.

This object is achieved when the recording device described in the preamble is characterized in that the control unit is operative for controlling the power of the radiation beam such that it has a rear heating pulse having a rear heating power level (r) directly following a last write pulse of a sequence, the rear heating power level (r) being higher than the erase power level (e).

An embodiment of the recording device according to the invention for recording marks having lengths of nT, where T represents the length of one period of a reference clock in a data signal and n represents a predetermined natural number larger than 1, is characterized in that the recording device comprises means for determining a first value for the rear heating power level ($r_1$) when n=2, a second value for the rear heating power level ($r_2$) when n=3, and a third value for the rear heating power level ($r_3$) when n≧4, said first value for the rear heating power level ($r_1$), second value for the rear heating power level ($r_2$) and third value for the rear heating power level ($r_3$) being dependent on properties of the recording medium.

An embodiment of the recording device according to the invention is characterized in that the control unit is operative for controlling the power of the radiation beam such that it has a front heating pulse having a front heating power level (f) directly preceding a first write pulse and a cooling pulse having a cooling power level (c) directly preceding the front heating pulse, the front heating power level (f) being higher than the erase power level (e) and the cooling power level (c) being lower than the erase power level (e).

An embodiment of the recording device according to the invention for recording marks having lengths of nT, where T represents the length of one period of a reference clock in a data signal and n represents a predetermined natural number larger than 1, is characterized in that the recording device comprises means for determining a first value for the front heating power level ($f_1$) when n=2, a second value for the front heating power level ($f_2$) when n=3, and a third value for the front heating power level ($f_3$) when n≧4, said first value for the front heating power level ($f_1$), second value for the front heating power level ($f_2$) and third value for the front heating power level ($f_3$) being dependent on properties of the recording medium.

It is a further object of the invention to provide a recording medium of the kind described in the preamble, adapted for use in the method and the recording device according to the invention.

This object is achieved when the recording medium described in the preamble is characterized in that the area containing recording parameters comprises a value for the rear heating power level (r).

This object is also achieved when the recording medium described in the preamble is characterized in that the area containing recording parameters comprises a value for the front heating power level (f).

This object is also achieved when the recording medium described in the preamble is characterized in that the area containing recording parameters comprises a value for the cooling power level (c).

Using the method and the recording device according to the invention, the rear heating power level (r), the front heating power level (f) and the cooling power level (c), respectively, can be assigned a value which depends on properties of the individual record carrier on which marks are to be recorded. The value for the rear heating power level (r), the front heating power level (f) and the cooling power level (c), respectively, corresponding to the individual record carrier is recorded on the record carrier according to the invention in an area containing recording parameters. This value can be directly read from the record carrier according to the invention by, for example, an embodiment of the method and an embodiment of the recording device according to the invention.

Figure 6:
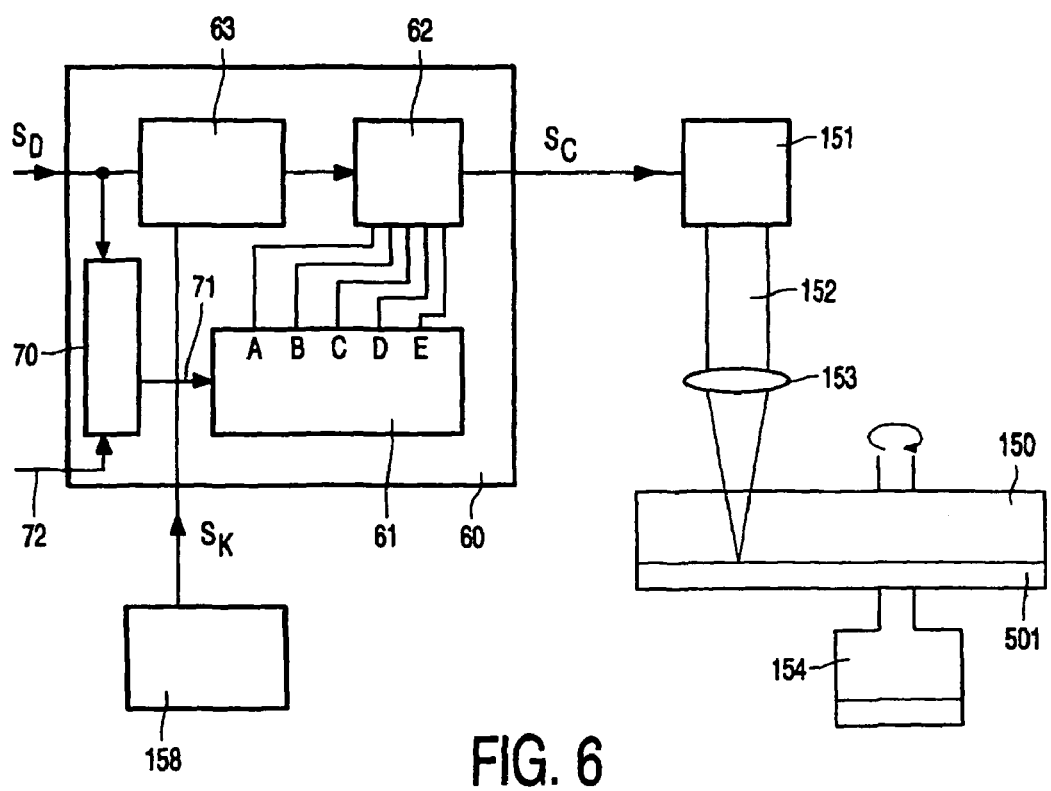

These and other objects, features and advantages of the invention will be apparent from the following, more particular description of embodiments of the invention, as illustrated in the accompanying drawings, where FIGS. 1 to 4 show diagrams comprising the time-dependence of a data signal and a corresponding control signal controlling the power levels of the radiation beam, FIG. 5 shows a diagram of a first recording device according to the invention, and FIG. 6 shows a diagram of a second recording device according to the invention.

FIG. 1 shows diagrams comprising two signals, a digital data signal 10 and a control signal 20, as used in the method according to the invention. FIG. 1a gives the value of the digital data signal 10 as a function of time, the value of the signal representing information to be recorded. The vertical broken lines indicate transitions in a clock signal of a data clock belonging to the data signal. The period of the data clock, also called the channel bit period, is indicated by T. When recording this data signal, a 'high' period 11 is recorded as a mark having a length corresponding to the duration of the 'high' period 11, and a 'low' period 12 is recorded as an unwritten area, a space, between the marks and having a length corresponding to the duration of the 'low' period. In general, the length of a mark is substantially equal to the number of channel bit periods of the data signal times the writing speed. The length of a mark is therefore often expressed by the number of data clock periods when the corresponding data signal is 'high' (e.g., 6T for a mark with a corresponding data signal being 'high' for 6 data clock periods, and 2T for a mark with a corresponding data signal being 'high' for 2 data clock periods).

The data is written in an optical record carrier comprising an information layer having a phase which is reversibly changeable between a crystal phase and an amorphous phase (i.e., a phase-change layer). The marks representing the data are written along a track in the information layer by irradiating the information layer with a pulsed radiation beam. The marks are areas of the information layer having optical characteristics which are different from their surroundings, which makes optical reading of these marks possible.

FIG. 1b shows a control signal 20 corresponding to the data signal 10 in a first embodiment of the invention. The control signal 20 is used for modulating the power of a radiation beam with which the marks are being written in the information layer, where it is assumed that the power level of the radiation beam is proportional to the level of the control signal.

FIG. 1b shows two sequences of pulses for successively writing a 6T mark and a 2T mark. Each sequence of pulses starts with a cooling pulse 27 having a cooling power level (c) 17. The power level in between the sequences is at an erase power level (e) 16. The power level in between the write pulses 21, 22 and 23, with the write pulses having a write power level 14, is at the cooling power level (c) 17. The last write pulse of a sequence 23 is directly followed by a rear heating pulse 24 having a rear heating power level (r) 15, and the first write pulse of a sequence 22 is directly preceded by a front heating pulse 25 having a front heating power level (f) 13. When recording a 2T mark, only a single write pulse 26 is applied, said single write pulse 26 being the first write pulse in the sequence and the last write pulse in the sequence at the same time.

In a preferred embodiment of the invention, the rear heating power level (r) and the front heating power level (f) are made dependent on the length of the marks to be recorded. FIG. 2 shows a first control signal 31 corresponding to a first data signal 30 and a second control signal 33 corresponding to a second data signal 32 in this preferred embodiment of the invention.

FIG. 2a shows a data signal 30 comprising successively a 2T mark and a 3T mark to be recorded. FIG. 2b shows the corresponding control signal 31. The front heating pulse 252 of the sequence of pulses for recording a 2T mark has a first front heating power level ($f_1$) 342, while the front heating pulse 253 of the sequence of pulses for recording a 3T mark has a second front heating power level ($f_2$) 341. FIG. 2c shows a data signal 32 comprising again the 2T mark now followed by a 4T mark to be recorded. FIG. 2d shows the corresponding control signal 33. The rear heating pulse 242 of the sequence of pulses for recording a 2T mark has a first rear heating power level ($r_1$) 351, while the rear heating pulse 244 of the sequence of pulses for recording a 4T mark has a second rear heating power level ($r_3$) 352.

In this example, the rear heating pulse 242 of the sequence of pulses for recording a 2T mark has a rear heating power level which is equal to that of the rear heating pulse 243 of the sequence of pulses for recording a 3T mark. However, the rear heating pulse 242 of the sequence of pulses for recording a 2T mark may alternatively have a rear heating power level which is different from that of the rear heating pulse 243 of the sequence of pulses for recording a 3T mark. Likewise, the front heating power level of the front heating pulse 253 for recording a 3T mark may alternatively have a value which is different from that of the front heating power level of the front heating pulse 254 for recording a 4T mark, although they have an equal value in this example.

In the example shown in FIG. 2, marks having a length longer than 4T will be recorded, using a front heating pulse having a front heating power level which is equal to that used for recording a 4T mark and using a rear heating pulse having a rear heating power level which is equal to that used for recording a 4T mark. It may be apparent to a person skilled in the art that marks having a length longer than 4T may alternatively be recorded, using front heating power levels and rear heating power levels which are optimized for each individual mark length. Besides the rear heating power level (r) and the front heating power level (f), also the cooling power level (c) of the cooling pulse may be dependent on the length of the marks to be recorded.

FIG. 3a shows a data signal 40 comprising successively a 2T mark and a 3T mark to be recorded. FIG. 3b shows the corresponding control signal 41. The cooling pulse 271 of the sequence of pulses for recording a 2T mark has a first cooling power level ($c_1$) 44, while the cooling pulse 272 of the sequence of pulses for recording a 3T mark has a second cooling power level ($c_2$) 45.

FIG. 4 shows an embodiment of the invention where the rear heating pulse includes a front portion and a rear portion. FIG. 4a shows a data signal 50 comprising a 3T mark to be recorded. FIG. 4b shows the corresponding control signal 51. The last write pulse of a sequence 23 is directly followed by a front portion 54 of the rear heating pulse, having a rear heating power level (r) 15, and subsequently by a rear portion 55 of the rear heating pulse. The rear portion 55 of the rear heating pulse has a power level 53 which is lower than the erase power level (e) 16.

FIG. 5 shows a recording device according to the invention for recording data on a disc-shaped optical record carrier 150. Alternatively, the record carrier may be in the form of a tape. A data signal $S_D$, comprising the information to be recorded in the form of marks, is connected to a control unit 60. A current source 61 within the control unit 60 has five outputs, A, B, C, D and E. Output A provides a current which, when fed to a radiation source 151, through a control signal $S_C$, will result in a radiation beam 152 having an erase power level (3). Likewise, outputs B, C, D and E provide currents resulting in the write power level, the rear heating power level (r), the front heating power level (f) and the cooling power level (c), respectively. The current of each output A, B, C, D, and E can be selected by a switchunit 62. The switchunit 62 is operated by a pattern generator 63 controlled by the data signal $S_D$ and a clock signal $S_K$. The pattern generator 63 transforms the data signal $S_D$ into sequences of pulses having a cooling power level (c), a write power level, a front heating power level (f), a rear heating power level (r), and an erase power level (e) in accordance with a desired pattern. The clock signal $S_K$ is obtained from a clock generator 158. When the recording device is used for writing at a single speed, the clock generator 158 is preset at a fixed frequency. When writing at a variable speed, the frequency of the clock generator 158 will vary with the actual writing speed.

The control signal $S_C$, provided at the output of the control unit 60 and carrying the sequences of write pulses, is connected to the radiation source 151. The control signal $S_C$ controls the power of the radiation beam 152 generated by the radiation source 151. The radiation beam 152 is focused by a lens 153 onto an information layer 501 of the record carrier 150. The disc-shaped record carrier 150 is rotated around its center by a motor 154.

This embodiment of a recording device according to the invention is suitable for executing the embodiments of the method according to the invention as shown in FIG. 1, using a single front heating power level (f) and a single rear heating power level (r) which are independent of the length of the marks to be recorded.

FIG. 6 shows a recording device according to the invention for recording on a disc-shaped optical record carrier 150, using values for the front heating power level (f) and the rear heating power level (r) which are dependent on the length of the marks to be recorded. The data signal $S_D$ is connected to a unit 70 comprising determination means. This unit 70 analyzes the data signal $S_D$ and determines the length of the marks to be recorded. Dependent on the length of a mark to be recorded, appropriate current settings for the outputs C (rear heating power level) and D (front heating power level) of the current source 61 are selected and transferred to the current source 61 through signal 71. In this way, instead of a single current, resulting in a single power level of the radiation beam, both output C and output B may supply different currents, resulting in different power levels of the radiation beam, the value of the currents being dependent on the length of the marks to be recorded.

Besides being dependent on the length of the marks to be recorded, the front heating power level (f) and the rear heating power level (r) may also be dependent on properties of the recording medium. Information concerning the optimal settings of the power levels for a specific record carrier on which data is to be recorded may be supplied to unit 70 through signal 72. The information concerning the optimal settings of the power levels may be supplied, for example, by a test procedure determining the optimal settings or, alternatively, may be read directly from an area containing recording parameters on the record carrier.

The invention claimed is:

1. A method of recording marks representing data in a recording medium, said recording medium comprising an information layer having a phase which is reversibly changeable between a crystal phase and an amorphous phase, by irradiating the information layer with a pulsed radiation beam, each mark being written by a sequence of pulses comprising at least one write pulse, the written marks being erasable by irradiating the information layer with a radiation beam having an erase power level, a first write pulse of a sequence of pulses being preceded by a cooling pulse having a cooling power level which is lower than the erase power level, said radiation beam being generated by a radiation source, characterized in that a last write pulse of a sequence is directly followed by a rear heating pulse having a rear heating power level, the rear heating power level being higher than the erase power level, and the rear heating power level being a different level from said last write pulse.

2. A method an claimed in claim 1, characterized in that the rear heating power level of the rear heating pulse is dependent on properties of the recording medium.

3. A method as claimed in claim 1 for recording marks having lengths of nT, where T represents the length of one period of a reference clock in a data signal and n represents a predetermined natural number larger than 1, each mark being written by a sequence of (n−1) write pulses, characterized in that the rear heating pulse has a first rear heating power level when n=2, a second rear heating power level when n=3, and a third rear heating power level when n≧4, the first rear heating power level, the second rear heating power level, and the third rear heating power level being dependent on properties of the recording medium.

4. A method as claimed in claim 1, characterized in that the first write pulse of a sequence is directly preceded by a front heating pulse having a front heating power level, the front heating pulse being directly preceded by the cooling pulse having a cooling power level, the front heating power level being higher than the erase power level.

5. A method as claimed in claim 4, characterized in that the front heating power level of the front heating pulse is dependent on properties of the recording medium.

6. A method as claimed in claim 4 for recording marks having lengths of nT, where T represents the length of one period of a reference clock in a data signal and n represents a predetermined natural number larger than 1, each mark being written by a sequence of (n−1) write pulses, characterized in that the front heating pulse has a first front heating power level when n=2, a second front heating power level when n=3, and a third front heating power level when n≧4, the first front heating power level, the second front heating power level, and the third front heating power level being dependent on properties of the recording medium.

7. A method as claimed in claim 4 for recording marks having lengths of nT, where T represents the length of one period of a reference clock in a data signal and n represents a predetermined natural number larger than 1, each mark being written by a sequence of (n−1) write pulses, characterized in that the cooling pulse has a first cooling power level when n=2, a second cooling power level when n=3, and a third cooling power level when n≧4, the first cooling power level, the second cooling power level, and the third cooling power level being dependent on properties of the radiation source and the recording medium.

8. A method as claimed in claim 1, characterized in that the cooling power level of the cooling pulse is dependent on properties of the radiation source and the recording medium.

9. A method as claimed in claim 1, characterized in that the rear heating pulse includes a front portion having the rear heating power level, and a rear portion having a power level which is lower than the erase power level.

10. A method of recording marks representing data in a recording medium, said recording medium comprising an information layer having a phase which is reversibly changeable between a c crystal phase and an amorphous phase, by irradiating the information layer with a pulsed radiation beam, each mark having a length of nT, where T represents the length of one period of a reference clock in a data signal and n represents a predetermined natural number larger than 1, the marks being written by a sequence of pulses comprising (n−1) write pulses, the written marks being erasable by irradiating the information layer with a radiation beam having an erase power level, a first write pulse of a sequence of pulses being preceded by a cooling pulse having a cooling power level which is lower than the erase power level, said radiation beam being generated by a radiation source, characterized in that the cooling pulse has a first cooling power level when n=2, a second cooling power level when n=3, and a third cooling power level when n≧4, wherein the first second and third cooling power levels are not all the same level and the first cooling power level, the second cooling power level, and the third cooling power level being dependent on properties the radiation source and of the recording medium.

11. A method as claimed in claim 10, characterized in that the first cooling power level is substantially equal to either the second cooling power level or the third cooling power level.

12. A recording device for recording data in the form of marks on a recording medium, said recording medium comprising an information layer having a phase which is reversibly changeable between a crystal phase and an amorphous phase, by irradiating the information layer with a pulsed radiation beam, the recorded marks being erasable by means of irradiating the information layer with a radiation beam having an erase power level, the device comprising a radiation source providing the radiation beam and a control unit for controlling the power of the radiation beam, the control unit being operative for providing a sequence of write pulses for writing a mark and controlling the power of the radiation beam such that it has a cooling power level which is lower than the erase power level preceding a first write pulse of a sequence of pulses, characterized in that the control unit is operative for controlling the power of the radiation beam such that it has a rear heating pulse having a rear heating power level directly following a last write pulse of a sequence, the rear heating power level being higher than the erase power level and the rear heating power level being a different level from said last write pulse.

13. A recording device as claimed in claim 12, characterized in that the recording device comprises means for determining a value for the rear heating power level, which value for the rear heating power level depends on properties of the recording medium.

14. A recording device as claimed in claim 13, said recording medium comprising said information layer having said phase which is reversibly changeable between said crystal phase and said amorphous phase, and said recording medium further comprising an area containing recording parameters, characterized in that the area containing recording parameters comprises a value for the rear heating power level.

15. A recording device as claimed in claim 12 for recording marks having lengths of nT, where T represents the length of one period of a reference clock in a data signal and n represents a predetermined natural number larger than 1, characterized in that the recording device comprises means for determining a first value for the rear heating power level when n=2, a second value for the rear heating power level when n=3, and a third value for the rear heating power level when n≧4, said first value for the rear heating power level, second value for the rear heating power level and third value for the rear heating power level being dependent on properties of the recording medium.

16. A recording device as claimed in claim 12, characterized in that the control unit is operative for controlling the power of the radiation beam such that it has a front heating pulse having a front heating power level directly preceding a first write pulse and a cooling pulse having a cooling power level directly preceding the front heating pulse, the front heating power level being higher than the erase power level and the cooling power level being lower than the erase power level.

17. A recording device as claimed in claim 16, characterized in that the recording device comprises means for determining a value for the front heating power level, which value for the front heating power level depends on properties of the recording medium.

18. A recording device as claimed in claim 17, said recording medium comprising said information layer having said phase which is reversibly changeable between said crystal phase and said amorphous phase, and said recording medium further comprising an area containing recording parameters, characterized in that the area containing recording parameters comprises a value for the front heating power level.

19. A recording device as claimed in claim 16 for recording marks having lengths of nT, where T represents the length of one period of a reference clock in a data signal and n represents a predetermined natural number larger than 1, characterized in that the recording device comprises means for determining a first value for the front heating power level when n=2, a second value for the front heating power level when n=3, and a third value for the front heating power level when n≧4, said first value for the front heating power level, second value for the front heating power level and third value for the front heating power level being dependent on properties of the recording medium.

20. A recording device as claimed in claim 16, characterized in that the recording device comprises means for determining a value for the cooling power level, which value for the cooling power level depends on properties of the recording medium.

21. A recording device as claimed in claim 20, said recording medium comprising said information layer having said phase which is reversibly changeable between said crystal phase and said amorphous phase, and said recording medium further comprising an area containing recording parameters, characterized in that the area containing recording parameters comprises a value for the cooling power level.

22. A recording device as claimed in claim 16 for recording marks having lengths of nT, where T represents the length of one period of a reference clock in a data signal and n represents a predetermined natural number larger than 1, characterized in that the recording device comprises means for determining a first value for the cooling power level when n=2, a second value for the cooling power level when n=3, and a third value for the cooling power level when n≧4, said which first value for the Cooling power level, second value for the cooling power level and third value for the cooling power level being dependent on properties of the radiation source and the recording medium.

23. A recording device as claimed in claim 12, characterized in that the control unit is operative for providing the rear heating pulse and controlling the power of the radiation beam such that the rear heating pulse includes a front portion having the rear
heating power level, and a rear portion having a power level which is lower than the erase power level.

24. A recording device for recording data in the form of marks on a recording medium, said recording medium comprising an information layer having a phase which is reversibly changeable between a crystal phase and an amorphous phase, and said marks having lengths of nT, where T represents the length of one period of a reference clock in a data signal and n represents a predetermined natural number larger than 1, by irradiating the information layer by a pulsed radiation beam, the recorded marks being erasable by irradiating the information layer with a radiation beam having an erase power level, the device comprising a radiation source providing the radiation beam and a control unit for controlling the power of the radiation beam, the control unit being operative for providing a sequence of write pulses for writing a mark and controlling the power of the radiation beam such that it has cooling power level which is lower than the erase power level preceding a first write pulse of a sequence of pulses, characterized in that the recording device comprises means for determining a first value for the cooling power level when n=2, a second value for the cooling power level when n=3, and a third value for the cooling power level when n≧4, said first value for the cooling power level, second value for the cooling power level and third value for the cooling power level being dependent on properties of the radiation source and the recording medium, wherein the first, second and third cooling power levels are not all the same level.

25. A recording device as claimed in claim 24, characterized in that the first value for the cooling power level is substantially equal to either the second value for the cooling power level or the third value for the cooling power level.

* * * * *